United States Patent
Raichuk et al.

[11] 3,710,066
[45] Jan. 9, 1973

[54] METHOD OF ELECTRIC-ARC WELDING OF TUBULAR PRODUCTS WITH MAGNETIC CONTROL OF THE ARC

[76] Inventors: Jury Isaakovich Raichuk, prospekt Gagarina, 88, kv. 33; Zakhar Osipovich Knyazhinsky, ulitsa Kirova, 8, kv. 4, both of Dnepropetrovsk; Simon Lvovich Mandelberg, bulvar Lesi Ukrainki. 2, kv. 55; Vladimir Konstantinovich Lebedev, ulitsa Engelsa, 25, kv. 12, both of Kiev; Viktor Nikolaevich Volkov, prospekt K. Marx a, 52, kv. 43, Dnepropetrovsk, all of U.S.S.R.

[22] Filed: June 28, 1971
[21] Appl. No.: 157,260

[52] U.S. Cl. .................219/61, 219/62, 219/123
[51] Int. Cl. ..................................B23k 31/06
[58] Field of Search.......219/60, 61, 62, 123, 124, 125 R, 219/126, 161

[56] References Cited

UNITED STATES PATENTS 1,827,657   10/1931   Ipsen.........................219/123

Primary Examiner—J. V. Truhe
Assistant Examiner—L. A. Schutzman
Attorney—Holman & Stern

[57] ABSTRACT

A method for the electric-arc welding of tubular products, in which a magnetic field is made to act upon the arc so as to control the process of welding, the method characterized in that the magnetic field is established in the welding zone by passing an electric current along the workpiece from a separate current source.

3 Claims, 2 Drawing Figures

PATENTED JAN 9 1973    3,710,066

METHOD OF ELECTRIC-ARC WELDING OF TUBULAR PRODUCTS WITH MAGNETIC CONTROL OF THE ARC

The present invention relates to metal-working industries, and more specifically to electric-arc welding of tubular products and may be utilized in the fabrication of electric-welded straight- and spiral-seam pipes and tubes.

Widely known in the prior art is a method for the electric-arc welding of tubular products which consists in that the workpiece is set up in a welding machine, an electrode is brought into the welding zone, and a magnetic field is established near the welding zone and at right angles to the edges to be welded. After that, the work-piece and electrode are connected to a welding source, a welding arc is initiated between the electrode and workpiece, and the two are made to move relative to each other and along the edge to be welded.

The magnetic field in the above-mentioned method can be established by one or several electromagnets each consisting of a coil and a core, with poles placed near the welding arc.

The heat generated in the welding zone produces a region of molten metal which, on cooling, produces a solidified weld.

An increase in welding speed without any controlling action of the magnetic field on the arc would result in a poor shape and quality of the weld, such as a narrow bead, undercuts, lack of proper fusion, and other flaws.

The transverse magnetic field causes the arc to deflect one way or the other, thereby controling the progress of welding. The effect is especially wholesome when the arc is deflected in the direction of welding. This deflection of the arc improves the quality of the weld and enables the welding speed to be raised. Conversely, the transverse magnetic field may be made to change the form of the weld while keeping the welding speed unchanged.

The above-mentioned method is widely used in the welding of non-magnetic steels and alloys. The application of this method to the welding of ferromagnetic materials entails a number of difficulties, and these limit its field of use.

These difficulties consist in that the ferromagnetic material of the workpiece provides a bypass for the magnetic field influencing the arc, thereby reducing its intensity within the arc zone and its effect on the arc.

Because of this, the power of the electromagnets has to be increased considerably.

The extent to which the magnetic flux is bypassed around the arc depends on the size of the air gaps between the poles of the electromagnet and the edges of the ferromagnetic workpiece. Poor fit-up or other like causes or a pipe skelp or burr may increase or decrease the gap between the edges of the workpiece. These variations in said air-gaps may result in instability of the magnetic flux in the arc zone, thereby seriously impairing the effectiveness of magnetic arc control.

The main object of the present invention is to provide a method for the welding of tubular products with a magnetically controlled electric arc, such that workpieces made of magnetically permeable materials can be successfully welded, irrespective of the position of the welding edges in space.

Another object of the present invention is to improve the shape and quality of welds at a constant welding speed or alternatively to raise the welding speed with a good quality of welds.

These effects are obtained owing to the deformation of the welding arc by a magnetic field and the utilization of the forces applied to the molten metal of the welding bath as a result of interaction between the transverse magnetic field and the current flowing in the molten metal of the weld region.

With these and other objects in view, the present invention resides in a method of electric-arc welding of tubular products comprising arranging a workpiece in a welding machine, advance of an electrode into the welding zone, establishment of a magnetic field around the welding zone, connection of the workpiece and electrode to a welding source, initiation of a welding are between the electrode and workpiece, and subsequent displacement of the electrode and workpiece relative to each other, the method of the invention characterized in that the magnetic field around the welding zone is established by allowing a current from another source to flow along the workpiece.

To improve the effectiveness of arc control and to prevent this current from being by passed through the bedframe of the welding machine, the tubular workpiece should preferably be electrically insulated from the welding machine on at least one side from the plane which is normal to the longitudinal axis of the workpiece and in which the electric arc occurs.

The method of the invention functions in the following manner.

The current allowed to flow along the workpiece in the course of welding establishes a transverse magnetic field in the arc zone, acting on both the arc and the bath or region of molten metal.

While in the prior-art method the unheated part of the closed magnetic circuit formed by the ferromagnetic tubular workpiece serves as a magnetic shunt reducing the strength of the magnetic field in the welding zone, in the method disclosed herein this part of the workpiece is utilized as a magnetic circuit building up the total magnetic field in the arc zone.

Any change in the relative position of the work edges in this case has no effect on the magnitude of the current applied to the workpiece from an additional source and, as a consequence, on the strength of the magnetic field in the welding zone. As a result, the controlling effect of the magnetic field on the progress of welding is stabilized and made independent of the relative position of the work edges in the course of welding.

With the current flowing along the workpiece so that the arc is deflected in the direction of welding and because of the stability of the controlling magnetic field, the quality of the welds is substantially improved and the welding speed may also be considerably raised.

Besides, part of the current passed along the workpiece has its path in the molten metal of the welding pool. Interaction of this part of current with the transverse magnetic field due to both the welding current and the current passed through the workpiece changes the shape of the welding pool, which further serves to improve the formation of the weld. The current passed through the workpiece from an additional source may be direct, alternating, pulsating, or combined.

The invention will be more fully understood from the following description of a preferred embodiment of a method for the electric arc welding of spiral-seam pipes, when read in connection with the accompanying drawings wherein.

Figure 2:
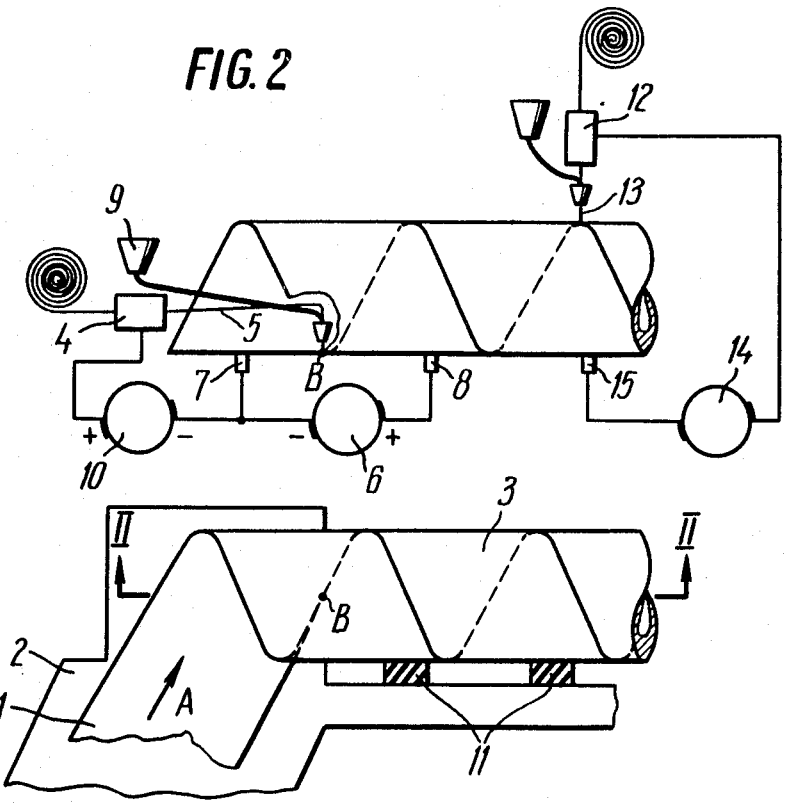
FIG. 2 shows section along line II-II of FIG. 1.
Figure 1:
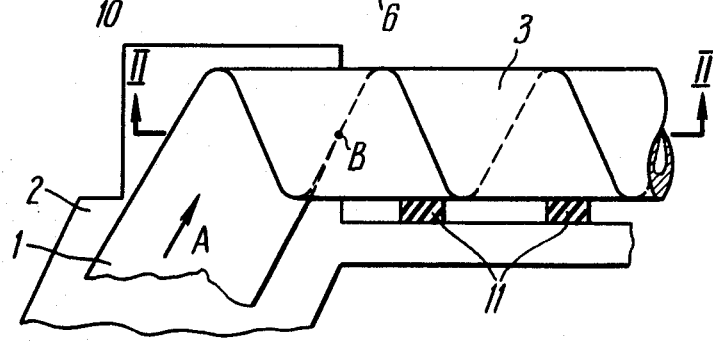
FIG. 1 is a top view of an apparatus for the fabrication of spiral-seam pipes a from a steel strip, according to the invention.

Referring to FIG. 1, in the fabrication of spiral-seam pipes, an elongated steel strip 1 is folded by a shaping device (not shown in the drawing) of a pipe-welding machine 2 into a spiral to form a pipe 3 (the direction in which the skelp is advanced is shown by the arrow A), and the pipe thus formed is welded from the inside and outside.

An electrode 5 is advanced by a welding head 4 to a point B where the edges of the strip 1 and of the formed pipe 3 converge.

In the welding zone of the inside weld a magnetic field is established by the current passed along the pipe 3 from a source 6 connected to the pipe via members 7 and 8. In the case of submerged arc welding, the requisite blanket of flux is built up by feeding the latter into the welding zone by a flux-feeding device 9.

In order to make the inside weld, the electrode 5 and the tube 3 are connected to the welding source 10 via the welding head 4 and the current transmitting member 7.

A welding arc is initiated between the electrode 5 and the edges of the workpiece and, as a result of continuous advance of the steel skelp 1 into the welding zone, a pipe is formed and its inside weld is made.

To enhance the effectiveness of the magnetic control of welding with the aid of the current passed along the workpiece, the pipe 3 is electrically insulated from the bedframe of the welding machine 2 insulating spacers 11.

Magnetic control by current in the welding of the inside weld consists in deflecting the arc in the direction of welding and in reducing the outflow of molten metal from the welding puddle owing the action of magnetohydrodynamic forces on the molten metal.

This is achieved by the proper selection of the relative polarity for the sources 10 and 6. The polarity for connection of the auxiliary source 6 is shown in the accompanying diagram where the electrode 5 is connected to the positive (+) side of the source 10. In this case, the current flowing in the workpiece from the source 6 deflects the arc in the direction of welding. Besides, there are forces acting on the molten metal of the weld puddle, which, owing to the polarities of the sources 6 and 10 as shown, are directed upwards, towards the axis of the pipe so that they prevent the molten metal from running out of the welding puddle. This improves the quality of the weld and serves to increase the speed of welding.

The outside weld of this pipe is made from above, at a distance from point B equal to 1½ turns of the weld, with a welding head 12 and an electrode 13 connected to a welding source 14 one side of which is connected to the pipe being welded via a current supplying member 15, and the other side to the welding head 12.

The accompanying diagram does not show the magnetic control of the arc making the outside weld of the pipe. If necessary, this may be accomplished in the same way as in the case of the inside weld.

In the example on hand, magnetic control is applied to the arc making the inside weld which is especially difficult to shape properly.

The point is that with a certain increase in the welding speed the proper shaping of the outside weld may be accomplished by shifting the welding point along the edges against the direction of travel, while in the case of the inside weld there is no such possibility.

The method for the electric-arc welding of pipes disclosed herein offers a means for a substantial increase in the speed of welding of spiral-seam pipes of mangetically permeable material.

What is claimed is:

1. A method for the production of a tubular product by electric-arc welding of a workpiece, comprising the following operations: placing of the workpiece in a welding machine in a welding zone thereof; advancing an electrode to the welding zone; connecting said workpiece through a current inlet contact member and a current outlet contact member away from said electrode to a first source of current and passing a current through the workpiece in the direction of the weld seam to be formed to establish a magnetic field in said workpiece; connecting the workpiece and said electrode to a second current source which is the welding source; initiating an arc between the electrode and workpiece causing molten metal at the region of said arc; and subsequently displacing the electrode and workpiece relative to each other, whereby said current from said first source flows through said molten metal, and the current carrying molten metal under the influence of said magnetic field results in production of a sound weld.

2. A method of claim 1, which includes the step of providing electrical insulation of the tubular workpiece from the welding machine on at least one side from a plane which is normal to the longitudinal axis of the workpiece and in which the welding arc is maintained.

3. A method for the production of a tubular product by electric arc welding of a workpiece, comprising the following operations: placing the workpiece in a welding machine in a welding zone thereof; providing electrical insulation of said workpiece from the welding machine body; advancing a welding electrode to the welding zone; connecting said workpiece to a first source of current and passing a current through the workpiece to establish a magnetic field in said workpiece; connecting the workpiece and said welding electrode to a welding current zone; passing current to the welding electrode and initiating an arc between the welding electrode and said workpiece; and displacing said welding electrode and said workpiece relative to each other.

* * * * *